United States Patent Office 3,018,963
Patented Jan. 30, 1962

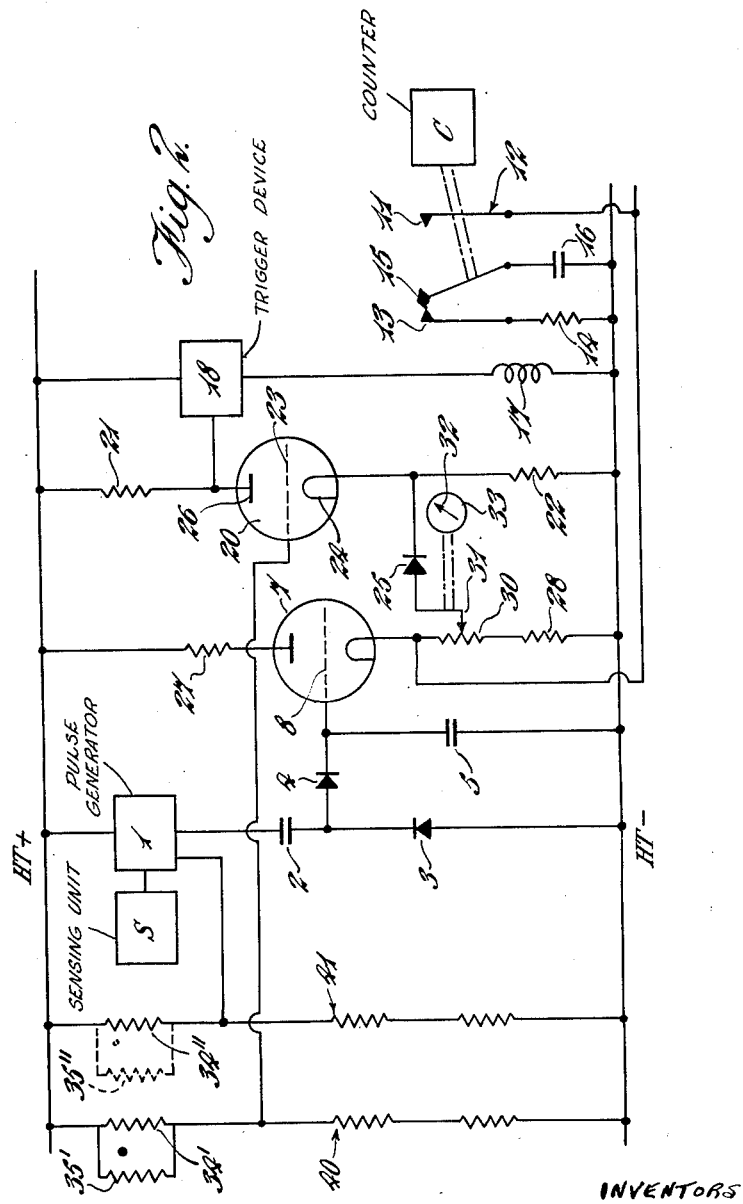

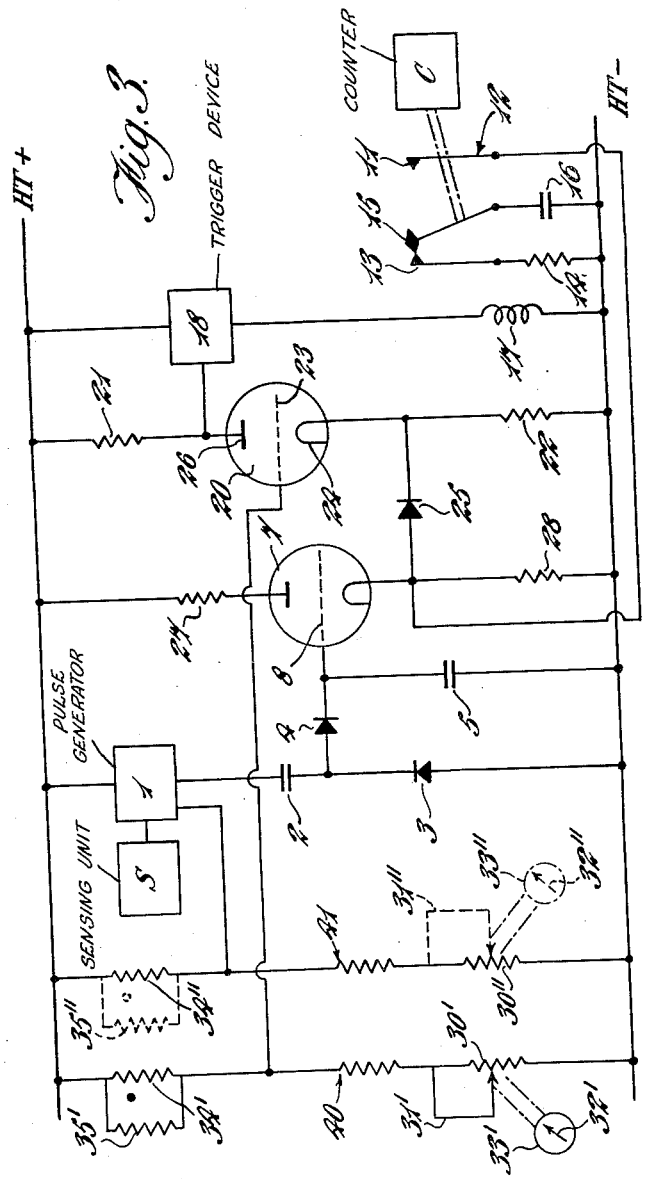

3,018,963
TEMPERATURE COMPENSATING INTEGRATING CIRCUITS FOR COUNTING ELECTRICAL PULSES
Edgar Raymond Reginald Chappell, 121 Ynyswen Road, Treherbert, Wales, and Harold Burns, 38 Insole Grove, Cardiff, Wales
Filed Aug. 20, 1958, Ser. No. 756,161
Claims priority, application Great Britain Aug. 21, 1957
10 Claims. (Cl. 235—183)

This invention relates to circuits for counting electrical pulses.

In the copending application Serial No. 617,092, now Patent No. 2,915,632, there is described a circuit of the kind comprising an integrating capacitor (alternatively called a tank or storage capacitor) which is adapted to be fed with electrical pulses all of the same kind whereby the charge on the integrating capacitor is brought to a predetermined level, switch means arranged to bring about a variation of the charge on the capacitor by a predetermined amount on the attainment of said charge level, and counting means operative once in every cycle of the integrating capacitor.

The present invention also concerns circuits of this kind.

An important application of the invention of the above-mentioned copending application No. 617,092 relates to the metering of fluid flow, which may be effected by using the circuit to count the pulses supplied by a flowmeter sensing unit of the general type exemplified by the unit described in the copending application Serial No. 604,200, now abandoned. It is commonly required that flowmeter indications be provided in terms of mass of fluid rather than volume, and it is the main object of the present invention to provide a circuit which can give a count dependent on mass of fluid. It is a subsidiary object of the present invention to provide such a circuit which can be set in accordance with fluid density at the beginning of measurement and which will thereafter provide automatic compensation for changes in density due to temperature variation.

The present invention provides, in a circuit of the above-mentioned kind, a potentiometer which is manually adjustable in accordance with fluid density and a thermistor network providing a resistance which, in use of the circuit, varies in accordance with liquid temperature, both potentiometer and thermistor network being adapted to vary the number of pulses required to effect one count whereby in use of the circuit with the potentiometer set for a given liquid the indications of the counting means are given in terms of mass flow irrespective of temperature variation.

Preferably the potentiometer is connected in the circuit of copending application No. 617,092, now Patent No. 2,915,632, between the integrating capacitor and the trigger device whereby to vary the charge level on the integrating capacitor at which level the trigger device triggers to discharge the said capacitor, and the thermistor network is also arranged to vary said charge level.

The invention has, however, a more general application than simply to fluid flow measurements: it can be employed whenever it is desired to have an indication dependent on one factor only, and that factor causes emission of electrical pulses at a rate dependent on the magnitude of the factor said rate being affected to a minor extent by temperature.

One embodiment of the invention will now be described by way of example with reference to the accompanying diagrammatic drawings in which:

FIGURES 2 and 3 are circuits generally similar to that of FIGURE 1 but showing modifications thereof.

Referring to the drawings, circuit components which correspond to those described in the above mentioned copending application Serial No. 617,092 are given the same reference numerals.

Figure 1:
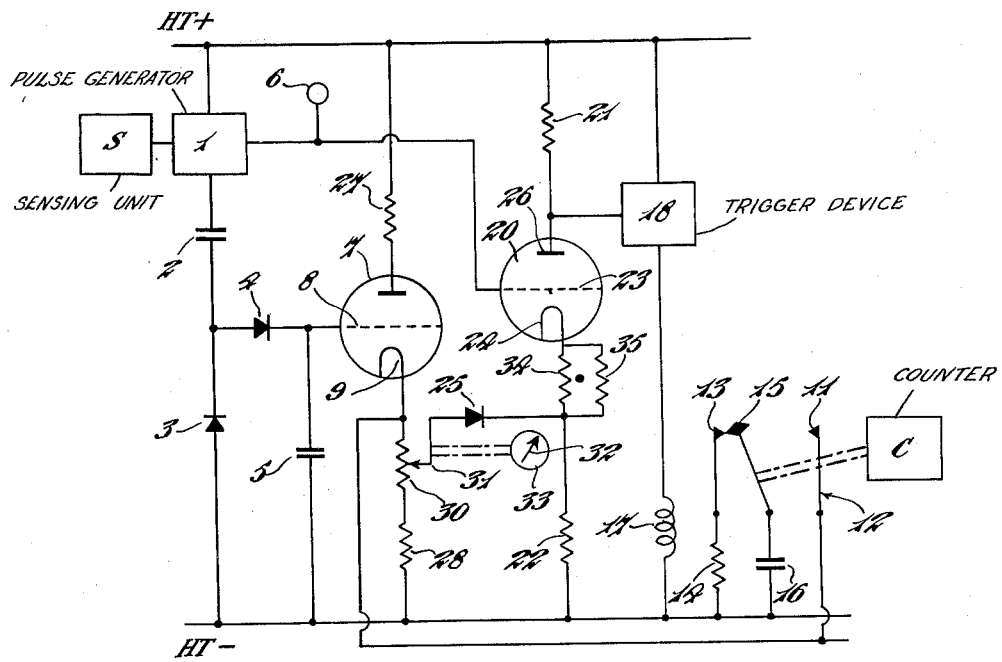
FIGURE 1 is a diagrammatic illustration of a flowmeter circuit.

A pulse generator 1 is arranged to supply pulses of uniform square wave form to a diode pump comprising a feed capacitor 2, a pair of diodes 3, 4 and an integrating capacitor 5, the frequency of the pulses being determined by that of pulses from a sensing unit S having the features described in the copending application No. 604,200, now abandoned, above referred to. The fixed voltages for the generator 1 are supplied by the H.T. line and a reference voltage the source of which is indicated at 6 may be a simple bleed resistor chain between the H.T. lines.

A hard valve 7 is arranged conventionally as a cathode follower; a resistor 27 is connected between its anode and the positive H.T. line, while a rheostat 30 is connected in series with a cathode load resistor 28 between the cathode 9 and the negative H.T. line. The control grid 8 of valve 7 is connected to the positive side of the integrating capacitor 5. The cathode 9 of the valve 7 is connected to one fixed contact 11 of a relay designated generally 12. The other fixed contact 13 of the relay 12 is connected to the negative H.T. line through a resistor 14 and the armature contact 15 of the relay is connected to this line through a sink capacitor 16. The relay 12 has an actuating coil 17 fed from the output of a trigger device 18 which is such that in the first of its stable states the relay coil 17 is unenergized and the armature contact 15 lies against the fixed contact 13 while in the second stable state of the device 18 the coil 17 is energized and the armature contact lies against the fixed contact 11.

A second hard valve 20 acting as amplifier is connected with anode and cathode load resistors 21, 22 respectively between the H.T. lines, and its grid 23 is connected to the reference potential source 6: a thermistor network, comprising a thermistor 34 located physically in the region of fluid to be metered, and a stabilizing shunt resistor 35, is placed in series with the cathode load resistor 22. The point of connection between the thermistor network and resistor 22 is itself connected to the wiper 31 of the rheostat 30 through a diode 25, and the anode 26 of the valve 20 is connected to the trigger device 18. The rheostat 30 is manually adjustable and its wiper 31 is mechanically connected to a pointer 32 moving over a dial 33 calibrated in terms of specific gravity.

The circuit functions as follows, ignoring for the moment the effect of the rheostat 30 and thermistor network, 34, 35: the trigger device 18 is arranged (as will appear in the following paragraph) to trigger from its first to its second stable state when the integrating capacitor 5 reaches its predetermined maximum charge level. When the voltage of the capacitor 5 is less than its maximum the relay coil 17 is unenergized and the sink capacitor 16 is short-circuited through the resistor 14. When the voltage of the capacitor 5 reaches its maximum the trigger device 18 triggers, the relay coil 17 is energized, and the sink capacitor 16 is connected to the cathode 9 of the valve 7 thus instantaneously the cathode 9 is earthed and grid 8 is at a positive potential. Hence grid current flows tending to reduce the grid voltage to earth potential, but is met on its downward trend by the rising voltage on cathode 9, due to the capacitor 16 charging to a positive voltage via the anode. Equilibrium exists when grid current ceases which occurs when a small negative bias exists. For all practical purposes the integrating and sink capacitors are then at the same potential. Initial conditions are then restored and the sink capacitor 16 is discharged through the resistor 14 when the relay returns to the position illustrated.

As charge builds up on the integrating capacitor 5 the voltage of the cathode 9 of the valve 7 increases. The voltage at the cathode 24 of the valve 20 will be the reference voltage applied to the grid 23, and no current will flow through the diode 25 until the voltage of the cathode 9 reaches the proportion of the reference voltage defined by the setting of the rheostat and the resistance thereof and of the thermistor network, 34, 35 and resistors 28, 22. After this, current will pass, the voltage at the cathode 24 will increase, thereby negatively biasing the valve 20, and the voltage at the anode 26 will accordingly rise until the firing point of the trigger device 18 is reached.

Operation of the relay is caused to effect a count by means of a second relay mechanically connected to the first and indicated diagrammatically at C.

The operation of the rheostat 30 and thermistor network 34, 35 will now be described: the rheostat wiper 31 is set so that the pointer 32 indicates when flow measurements are begun, the specific gravity of the fluid referred to a given datum temperature (e.g. 20%).

Adjustment of the rheostat has the effect of varying the charge level on the capacitor 5 at which the trigger triggers. This will alter the number of pulses from the sensing unit S required to effect one count on the counter C: after proper setting of the rheostat 30 the counts on the counter C will be proportional both to the volume of fluid flowing through the unit S and to the density of the fluid, i.e. the count will be in terms of mass. Variation of the thermistor resistance will also alter the charge level on capacitor 5 at which the trigger triggers: the network 34, 35 is so arranged that if, after correct initial adjustment of the wiper 31 the fluid is subjected to a change in temperature the thermistor 34 changes its resistance whereby the total effect of the rheostat 30 and thermistor network 34, 35 will be altered as if the rheostat had been re-adjusted to the new specific gravity resulting from the change in temperature. The count in terms of mass will therefore always be correct.

A flowmeter such as above described is particularly suitable for use in measuring fuel flow in aircraft since flow measurements will normally be required in terms of mass, the fuel is often subjected to great changes in temperature and it is important to avoid complicated and bulky apparatus such as is commonly necessary to provide a continuous and automatic density measurement.

The circuit above described provides a measurement of the amount of flow: it will commonly be combined with a circuit for indicating rate of flow such as described in our copending application Serial No. 756,162 based on British application No. 26,398/57. The arrangement of thermistor network just described will not affect the rate circuit and is preferred for this reason.

However, if no rate circuit is used, or such circuit is entirely separate from the amount circuit, the thermistor network can, as shown in FIGURE 2, be made to affect the reference voltage fed to the amplifier valve 20, the source being a bleed resistor chain 40 and the thermistor network here designated 34', 35' forming part of it.

The thermistor network could alternatively be made to affect the amplitude of pulses fed by the pulse generator 1 to the feed capacitor 2. This may be done by removing the thermistor network to a bleed resistor chain 41 as shown dotted in FIGURE 2, where its elements are designated 34", 35".

Similarly, as shown in FIGURE 3, the potentiometer 30, 31 may be moved into one or other of the resistor chains 40, 41 together with the thermistor networks, with the effects outlined above. In the alternative positions shown in full lines and dotted lines the potentiometer elements are designated respectively 30', 31' and 30", 31". Various permutations of the thermistor network and potentiometer positions are possible.

We claim:

1. An electrical circuit to give an indication dependent on one factor only, which factor causes emission of electrical pulses at a rate dependent on the magnitude thereof, said rate being also affected by temperature to a minor extent comprising an integrating capacitor, pulse feeding means to receive said pulses and feed them to the integrating capacitor to charge it from a first to a second level, a second capacitor, a normally interrupted low-impedance discharge path connecting the integrating capacitor and the second capacitor for effective charge equalization between said two capacitors, a normally closed path connecting opposite plates of the second capacitor to maintain them at a fixed relative potential, a relay having an operating coil and being capable of two alternative states, the relay in its normal state interrupting said first mentioned path and closing the second mentioned path and in its second state closing the first and interrupting the second path, operation of the relay from its normal to its second state thereby bringing the integrating capacitor charge level from its second to its first level, buffer and amplifier means connected to the integrating capacitor, the buffer means presenting high impedance to the integrating capacitor in the open condition of said first mentioned path, trigger means which has two alternative stable outputs and is connected to the output of the amplifier means whereby the integrating capacitor charge level determines the output of the trigger means, the trigger means having its output connected to the relay operating coil and maintaining the relay in its normal state until the integrating capacitor reaches the second charge level and then momentarily actuating the relay to its second state, counting means operable in every cycle, a potentiometer manually adjustable to set the number of pulses required for one count and a thermistor network connected to the amplifier means for varying the bias thereon in response to changes in temperature thereby altering said number of pulses in a direction to compensate for the effect of said temperature change on said pulse emission rate.

2. A circuit as claimed in claim 1 wherein the manually adjustable potentiometer is connected to the amplifier means for manual adjustment of the bias thereon thereby altering said second charge level.

3. A circuit as claimed in claim 1 comprising a reference potential source, a pulse generator to receive said emitted pulses and to deliver uniform output pulses to the pulse-feeding means, said generator being connected to the reference potential source such that the character of the delivered pulses is dependent thereon, said potentiometer being associated with the reference potential source, thereby varying the character of said output pulses.

4. A circuit as claimed in claim 1 wherein said buffer means is a cathode follower stage including a tube having an anode, cathode and control grid, said control grid connected to the integrating capacitor and the amplifier means comprises a tube having at least an anode, a cathode and control grid, the anode of said amplifier means being connected to the trigger means, the cathode of said amplifier means being connected to said cathode follower, and the grid of said amplifier means being connected to said thermistor network.

5. A circuit as claimed in claim 2 wherein the potentiometer and thermistor network are series-connected between the buffer and amplifier means.

6. For use with a fluid-flow sensing device emitting trigger pulses at a rate dependent on volume of fluid flow, frequency-dividing apparatus to indicate the amount of flow in terms of mass comprising a reference potential source, a pulse generator to receive said trigger pulses and to emit uniform pulses at a rate proportional to that of the trigger pulses, the generator being connected to the source whereby the character of the pulses is dependent on the potential thereof, an integrating capacitor, means connected between the generator and integrating capacitor to feed said uniform pulses to the integrating capacitor to charge it between a first and a second charge level, an amplifier, trigger means having an input and an output, the output adopting either a normal or a second stable condition in accordance with the input voltage, the input being connected through said amplifier to the integrating capacitor whereby the trigger means input voltage is dependent on the charge level of the integrating capacitor whereby said integrating capacitor causes the output of said trigger means to change to its second condition when said capacitor is charged to its second charge level, a low impedance current path connecting said integrating capacitor with means for rapidly altering the charge level thereof from the second to the first level, normally open switch means in said current path, actuating means for said switch means under the control of the output of said trigger means to effect closure of said path when the trigger means output is in its second condition, a manually settable resistor adjustable in accordance with fluid density, and a thermistor network comprising a thermistor located to assume the temperature of the fluid, the resistor and network being connected to the grid of said amplifier to control the bias on the amplifier grid whereby setting of the resistor adjusts said number of pulses so that at a given temperature the counting means counts out the amount of flow in terms of mass, and said network is effective to adjust said number to cancel out the effect of temperature upon the indications of the counting means for any given mass flow rate.

7. Apparatus as claimed in claim 6 wherein the switch means is a relay and the actuating means is an actuating coil thereof, said means for altering the charge level is a sink capacitor, the relay interconnecting the integrating and sink capacitors in the second condition of the trigger means output, and the relay having back contacts connected with the sink capacitor to discharge it when the trigger means output is in its normal condition.

8. Apparatus as claimed in claim 6 wherein the amplifier is a grid-controlled vacuum tube having its cathode connected to the integrating capacitor through a cathode follower and the thermistor network is connected to alter the grid potential of the amplifier tube in response to impedance changes.

9. Apparatus as claimed in claim 6 including a cathode follower feeding the amplifier and having the variable resistor as part of its cathode load.

10. Apparatus as claimed in claim 9 wherein the thermistor network is located between the variable resistor of the amplifier and the amplifier is a grid-controlled vacuum tube with said network in its cathode load.

References Cited in the file of this patent

UNITED STATES PATENTS

| | | |
|---|---|---|
| 2,359,767 | Keinath | Oct. 10, 1944 |
| 2,622,231 | Gray | Dec. 16, 1952 |
| 2,864,556 | Raymond | Dec. 16, 1958 |
| 2,891,725 | Blumemthal et al. | June 23, 1959 |

OTHER REFERENCES

Automatic Control (Terzian), August 1958, pp. 10–13.